Oct. 18, 1932.  M. H. MARTIN  1,883,742
AUXILIARY SPRING MECHANISM FOR TRUCKS
Filed May 11, 1928
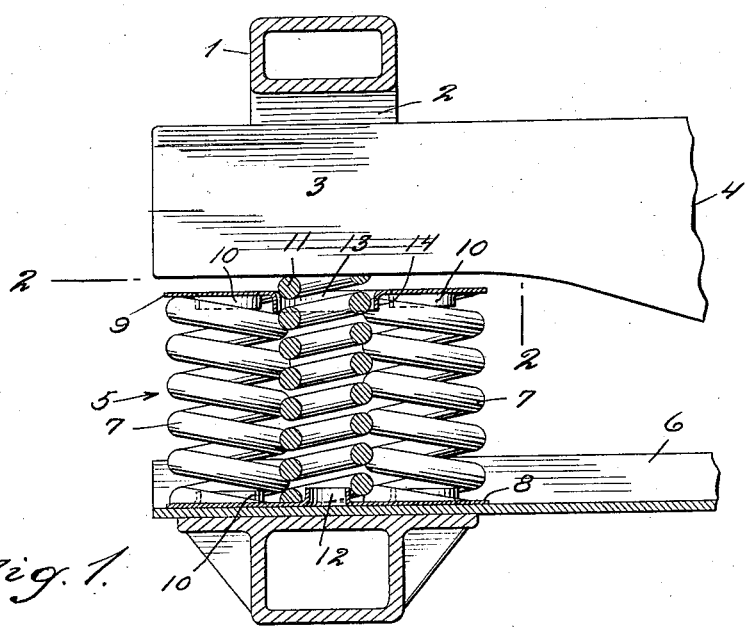
Fig. 1.
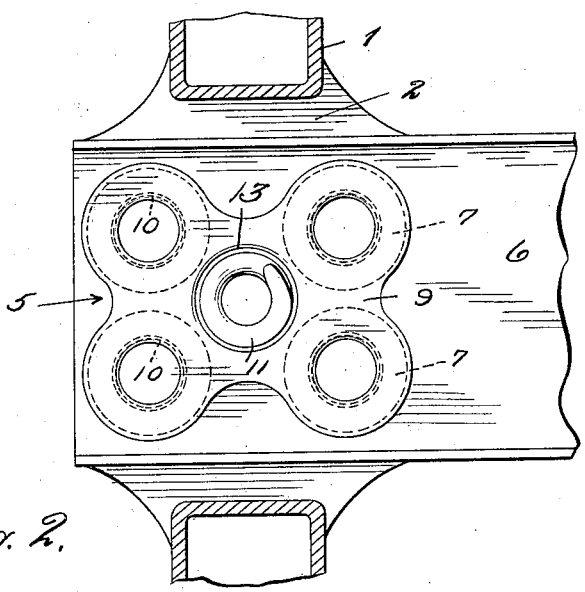
Fig. 2.
Inventor
Mark H. Martin
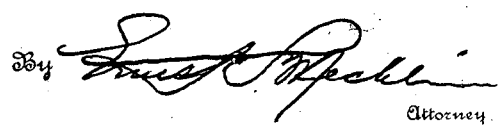
Attorney Patented Oct. 18, 1932

1,883,742

UNITED STATES PATENT OFFICE

MARK H. MARTIN, OF BALTIMORE, MARYLAND, ASSIGNOR TO T. H. SYMINGTON & SON, INC., OF BALTIMORE, MARYLAND, A CORPORATION OF MARYLAND

AUXILIARY SPRING MECHANISM FOR TRUCKS

Application filed May 11, 1928. Serial No. 277,081.

The invention relates to railway trucks and has special reference to the spring means for supporting the load.

The principal object of the invention, generally stated, is to provide auxiliary spring means operating in parallel with the usual truck springs provided for supporting the bolster, the auxiliary springs acting not only to increase the general spring travel but also serving to maintain the side bearings of the truck and body bolsters in engagement at all times.

The invention is particularly designed for use in connection with installation or equipment of that type wherein the load is sustained either entirely, partly or occasionally by side bearings, the auxiliary spring means materially assisting in holding the light wheel or wheels in contact with the rail when the car is rocked violently as for example when entering upon or leaving curved track, the effect being really the equivalent of adding dead weight to the side of the truck upon which there is a tendency for the wheels to unload.

Another specific object of the invention is to provide an auxiliary spring means of this character which may be located within the confines of or centrally with respect to the usual truck springs of nest formation and arrangement and passing through the top spring cap for engagement with the underside of the truck bolster.

A further object of the invention is the provision of spring means of this character so mounted and arranged as to be free from changing strains under normal load conditions and prevented from ever going solid with the resultant advantage that a long life will be assured.

An additional object of the invention is to provide a spring means of this character which will be simple and inexpensive to manufacture and install, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawing in which:

Figure 1 is a vertical cross section through a truck side frame and the spring nest supporting the truck bolster, the bolster being shown in elevation, Figure 2 is a horizontal section through the side frame taken immediately beneath the truck bolster to show a plan view of the spring assembly.

Referring more particularly to the drawings the numeral 1 designates a truck side frame of any ordinary or preferred type having a window opening 2 therein through which extends the end portion 3 of the truck bolster 4, a nest of coil springs indicated as a whole by the numeral 5 being interposed between the underside of the bolster and the spring plank 6 which is likewise mounted within the window opening. Spring nests such as that referred to at 5 generally comprise four or more helical springs 7 symmetrically grouped and arranged between spring caps 8 and 9. Ordinarily such caps may be duplicates but in the present instance some modification is necessary to carry out the invention. The caps are represented as having punched-out bosses 10 fitting within the ends of the springs for retaining them in proper position and preventing displacement.

In carrying out the invention, I provide an auxiliary spring 11 of helical form located centrally of the group of springs 5 and centered at its lower end by means of an upstruck boss 12 at the center of the bottom cap 8. The top cap 9 is formed with a central opening 13 surrounded by a depending flange 14, the opening being for the passage of the spring 11 so that it may bear directly against the underside of the truck bolster as clearly shown in Figure 1.

In the operation the auxiliary spring will be compressed under the light car until the spring caps on the nests of truck springs engage upon the spring plank and against the bolster. In this position or under these conditions the static load on the auxiliary spring is slightly less than the light weight of the car on the truck springs. The load on the auxiliary spring should compress them an appreciable amount, say one inch, to compensate and maintain the side bearing elements, not shown, in contact with the coacting depending bearing elements on the body bolster as there is a tendency for these surfaces to move out of contact. The invention is therefore well adapted for use in installations where there are side bearing rollers or rockers on the truck bolster cooperating with depending bearing elements on the body bolster, the parts being arranged to permit lateral motion of the body bolster with respect to the truck. In this respect the general features and principles involved in the present application are similar to what is embodied in the co-pending application of Percy R. Drenning, filed November 12th, 1927, Serial No. 232,859 wherein are disclosed auxiliary springs located within the truck bolster and cooperating with the spring caps. At the normal spring load the travel should not put the spring solid and therefore the stress can be kept reasonably low. As the working of the auxiliary springs is infrequent their life should be indefinite. In case the auxiliary springs are provided in an installation of the rigid type or where the load is sustained on the center bearings with a nominal clearance at the side bearings, the action will be substantially the same as the auxiliary springs will operate to act against any tendency of the wheels to unload at one side or the other of the truck as for example when the car enters upon or leaves curved track, or develops, from any cause, a violent tendency to rock. In such an instance the auxiliary springs will act substantially as additional dead weight applied to the light side.

In addition to the foregoing advantages it may be pointed out that as the auxiliary springs are preferably lighter than the truck springs they will act more quickly and will be capable of taking up small shocks and jars or "jiggle" incident to car travel. It may also be mentioned that the auxiliary springs can be compressed to only a limited extent governed by the engagement of the top or bottom spring caps with the underside of the bolster and the spring plank respectively. A solid condition with resultant excessive fiber and other strains will be consequently avoided. Moreover it is conceivable that under some circumstances the difference in the period of vibration of the truck and auxiliary springs will break up synchronism and assist in preventing the development of car roll or side sway. From the foregoing it is believed that the construction, operation and advantages will be readily apparent to one skilled in the art without further explanation.

While I have shown and described preferred embodiments of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In a railway car truck embodying side frames, a truck bolster, a spring nest located within the side frame for supporting the truck bolster, the spring nest having caps, and auxiliary spring means engaging one of the caps and operating constantly in parallel with the springs in the nest, the other cap being apertured for the passage of the auxiliary spring means.

2. In a railway car truck embodying side frames having window openings therein providing spring seats, a truck bolster having its ends extending into said window openings, a group of truck springs of A. R. A. standard free height within each window opening for supporting the truck bolster, and auxiliary helical spring means of greater free height located within the confines of the truck springs as a group and abutting against the spring seat and directly against the underside of the bolster.

3. In a railway car truck embodying side frames having window openings therein providing spring seats, a truck bolster having its ends extending into said window openings, a group of A. R. A. standard free height truck springs within each window opening for supporting the truck bolster, and auxiliary helical spring means of greater than standard free height located within the confines of the truck springs as a group and abutting against the spring seat and the underside of the bolster, the auxiliary spring means being initially of greater height than the truck springs.

4. In a railway car truck embodying side frames having window openings therein providing spring seats, a truck bolster having its ends extending into said window openings, a group of standard free height truck springs within each window opening for supporting the truck bolster, and auxiliary helical spring means located within the confines of the truck springs as a group and abutting against the spring seat and the underside of the bolster, the auxiliary spring means having greater free height and travel and less capacity than any of the truck springs.

5. In a railway car truck, a side frame having a window opening therein, a truck bolster having its end extending through the window opening, a nest of truck springs within the window opening for supporting the truck bolster, said nest of springs including top and bottom caps, and an auxiliary spring located within the confines of said truck springs and engaging upon the bottom cap and against the underside of the bolster, the top cap having an opening for the passage of said auxiliary spring.

6. In a railway car truck, a side frame having a window opening therein, a truck bolster having its end extending through the window opening, a nest of truck springs within the window opening for supporting the truck boltser, said nest of springs including top and bottom caps, and an auxiliary spring located within the confines of said truck springs and engaging upon the bottom cap and against the underside of the bolster, the top cap having an opening for the passage of said auxiliary spring, and the bottom cap having an upstanding boss engaging within the lower end of the auxiliary spring.

7. A spring unit for use in the window opening of a side frame for supporting a truck bolster, comprising a nest of truck springs, top and bottom caps therefor having guide means entering the ends of the springs, the top cap having a central opening, and a centrally arranged auxiliary spring within the nest extending through said opening for engagement with the truck bolster.

In testimony whereof I affix my signature.

MARK H. MARTIN.